US011467556B2

(12) United States Patent
Park et al.

(10) Patent No.: US 11,467,556 B2
(45) Date of Patent: Oct. 11, 2022

(54) SYSTEM AND METHOD FOR PROJECTION OF LIGHT PATTERN ON WORK-PIECE

(71) Applicant: Honda Motor Co., Ltd., Tokyo (JP)

(72) Inventors: Leslie Park, Los Angeles, CA (US); Christopher Yee, Redondo Beach, CA (US); Betsy Luk, San Diego, CA (US); Don Herner, Tustin, CA (US); Charles Eddy, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 563 days.

(21) Appl. No.: 16/560,267

(22) Filed: Sep. 4, 2019

(65) Prior Publication Data

US 2021/0063992 A1 Mar. 4, 2021

(51) Int. Cl.
*G05B 19/402* (2006.01)
*G06T 7/521* (2017.01)
(Continued)

(52) U.S. Cl.
CPC .......... *G05B 19/402* (2013.01); *G01B 11/254* (2013.01); *G06T 7/0004* (2013.01);
(Continued)

(58) Field of Classification Search
CPC ........ G05B 19/402; G05B 2219/37336; G01B 11/2513; G01B 11/254;
(Continued)

(56) References Cited

U.S. PATENT DOCUMENTS

| 7,246,030 B2 * | 7/2007 | Raab ................... G01B 21/042 702/155 |
| 2003/0131707 A1 * | 7/2003 | Yotsumoto ............ B26D 11/00 83/52 |

(Continued)

FOREIGN PATENT DOCUMENTS

| CN | 201752427 U | 3/2011 |
| CN | 101929063 B | 4/2012 |

(Continued)

OTHER PUBLICATIONS

Jason Geng, ("DLP-Based Structured Light 3D Imaging Technologies and Applications" Proceedings of SPIE, vol. 7932).*

(Continued)

*Primary Examiner* — Dakshesh D Parikh
(74) *Attorney, Agent, or Firm* — Aaron Fong; American Honda Motor Co., Inc.

(57) ABSTRACT

A system and a method for projection of a pattern of light on a work-piece are provided. The system includes an optical sensor, circuitry, and a projection device. The circuitry controls the optical sensor to capture a first plurality of light signals that bounces off from a surface of a work-piece and estimates a plurality of surface features of the work-piece based on the captured first plurality of light signals. The circuitry determines projection information for a pattern of light to be projected onto the surface of the work-piece based on the estimated plurality of surface features. Based on the determined projection information, the circuitry controls the (Continued)

projection device to project the pattern of light onto the surface of the work-piece.

16 Claims, 7 Drawing Sheets (51) Int. Cl.
*G06T 7/60* (2017.01)
*G01B 11/25* (2006.01)
*G06T 7/00* (2017.01)

(52) U.S. Cl.
CPC ............... *G06T 7/521* (2017.01); *G06T 7/60* (2013.01); *G05B 2219/37336* (2013.01); *G06T 2207/10028* (2013.01); *G06T 2207/30164* (2013.01)

(58) Field of Classification Search
CPC . G06T 2207/10028; G06T 2207/30164; G06T 7/0004; G06T 7/521; G06T 7/60

See application file for complete search history.

(56) References Cited

U.S. PATENT DOCUMENTS

| 2010/0026963 | A1  | 2/2010  | Faulstich |
|---|---|---|---|
| 2012/0262573 | A1* | 10/2012 | Bridges ................... G01C 3/08 348/135 |
| 2016/0197452 | A1  | 7/2016  | Mor |
| 2016/0377410 | A1* | 12/2016 | Becker ............... G01B 11/2545 356/3.11 |
| 2016/0377414 | A1  | 12/2016 | Thuries et al. |
| 2017/0134710 | A1* | 5/2017  | Wang ................... H04N 5/3765 |
| 2019/0056334 | A1* | 2/2019  | Safai ..................... G01N 21/956 |
| 2019/0290297 | A1* | 9/2019  | Haider ................... A61B 34/20 |
| 2020/0081097 | A1* | 3/2020  | Abe ....................... G01S 7/4865 |

FOREIGN PATENT DOCUMENTS

| JP | 2010-264571 A | 11/2010 |
|---|---|---|
| WO | 2017/018601 A1 | 2/2017 |

OTHER PUBLICATIONS

J. Batlle et al. ("Recent Progress in Coded Structured Light as a Technique to Solve the Correspondence Problem: A Survey", Pattern Recognition, vol. 31, No. 7, pp. 963-982, 1998).*

* cited by examiner

SYSTEM AND METHOD FOR PROJECTION OF LIGHT PATTERN ON WORK-PIECE

BACKGROUND

Various cutting tools are available to cut out and remove materials from a work-piece. Usually, some of the cutting tools require some form of a user input. In certain instances, to model a desired structure, an operator may have to hold a handheld cutting tool and perform certain cutting maneuvers on a work-piece, while ensuring that all cutting maneuvers are correct and lead to the desired structure. For this, the operator may refer to a reference design (e.g., a paper design or a digital design) of the desired structure. However, at different times while cutting the work-piece, the operator may miss to see certain details on the surface of the work-piece, especially ones which are intricate, visually unnoticeable, or less apparent. As a result, the operator may end up applying inaccurate cuts or cutting maneuvers on the work-piece and the resulting structure may be of a lesser quality as it may lack several details of the reference design. Therefore, there is a need of a system that could assist the operators to operate on work-pieces, without loss of details.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a system to project a pattern of light on a work-piece. The system may include a projection device, an optical sensor, and circuitry. The circuitry may be configured to control the optical sensor to capture a first plurality of light signals that may bounce off from the surface of a work-piece. The circuitry may be further configured to estimate a plurality of surface features of the work-piece based on the captured first plurality of light signals. The circuitry may be further configured to determine projection information for a pattern of light to be projected onto the surface of the work-piece, based on the estimated plurality of surface features. The circuitry may be further configured to control the projection device to project the pattern of light onto the surface of the work-piece, based on the determined projection information.

Another exemplary aspect of the disclosure provides a method for projecting a pattern of light on a work-piece. Any system, for example, a system which includes a projection device and an optical sensor, may execute operations specified in the method. The method may include controlling the optical sensor to capture a first plurality of light signals that bounces off from the surface of a work-piece. The method may further include estimating a plurality of surface features of the work-piece based on the captured first plurality of light signals and determining projection information for a pattern of light to be projected onto the surface of the work-piece, based on the estimated plurality of surface features. The method may further include controlling the projection device to project the pattern of light onto the surface of the work-piece, based on the determined projection information.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system to project a pattern of light on a work-piece. Exemplary aspects of the disclosure provide a system that includes a projection device to project a pattern of light on a work-piece. With the projection of the pattern of light, users, especially operators who use handheld cutting tools, may be able to see various details, especially ones which are intricate, visually unnoticeable, and less apparent on the surface of the work-piece. For example, light pattern may appear to be curved on a curved surface and may help a user to identify the curvature of the curved surface. Additionally, such users may be able to perform desired cutting maneuvers on the work-piece and ensure that all cutting maneuvers are correct and lead to a desired structure. Additionally, such users may be able apply precise cuts on the work-piece as they may be able to clearly identify intricate details or different shape features (e.g., a door or a car bonnet as a shape feature) on the surface of the workpiece. The resulting structure may be of a superior quality as it may include most of the required details of the desired structure.

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
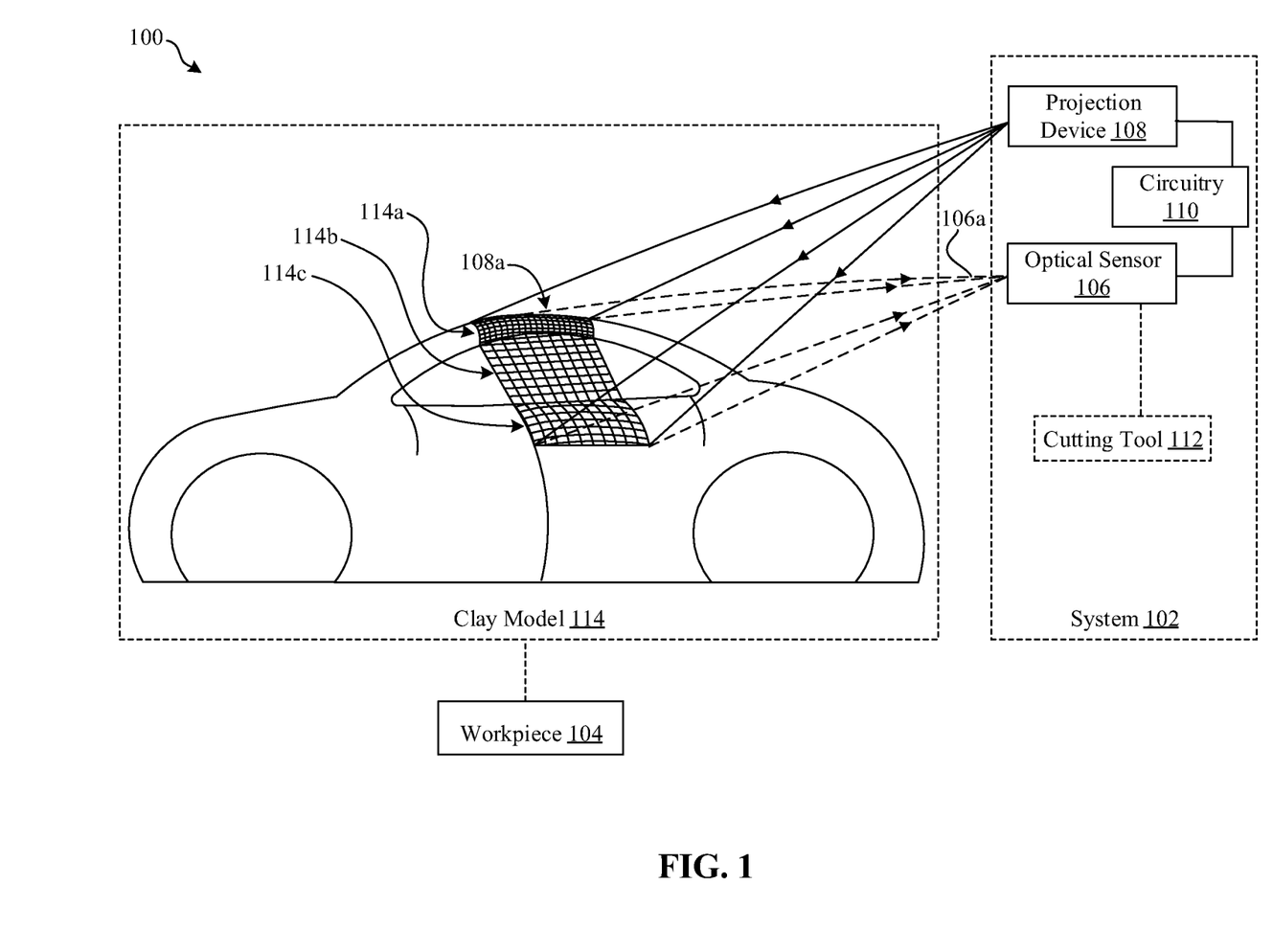
FIG. 1 illustrates an example environment diagram for projection of a pattern of light on a work-piece, in accordance with an embodiment of the disclosure.

FIG. 1 illustrates an example environment diagram for projection of a pattern of light on a work-piece, in accordance with an embodiment of the disclosure. With reference to FIG. 1, there is shown an example environment diagram 100. The example environment diagram 100 may include a system 102 and a work-piece 104. The system 102 may include an optical sensor 106, a projection device 108, and circuitry 110 communicably coupled with the projection device 108 and the optical sensor 106. Additionally, in some embodiments, the system 102 may further include a cutting tool 112.

The system 102 may include suitable logic, circuitry, and interfaces that may be configured to scan the surface of the work-piece 104 and the project a pattern of light onto the surface of the work-piece 104. Examples of implementation of the system 102 may include, but are not limited to, for example, a handheld tool, a programmatically-controlled machine, a portable tool, a cutting or a machining equipment, a desktop scanner, a wearable device, a head-mounted device.

The work-piece 104 may be an unfinished article, a partially finished article, a fully finished article, or an article of manufacture. The work-piece 104 may be made up partially or completely of, for example, at least one of a metal, wood, clay, glass, wax, plastic, a fabric, an organic polymer, an inorganic polymer, or a hybrid polymer. By way of example, the work-piece 104 may be a clay model 114 of a vehicle. It should be noted that the clay model 114 is merely shown as an example. The present disclosure may be also applicable to other types of models, without departing from the scope of the disclosure.

The optical sensor 106 may include suitable logic, circuitry, and interfaces that may be configured to capture a first plurality of light signals (e.g., a first plurality of light signals 106a) which may bounce off from the surface of the work-piece 104. The optical sensor 106 may be configured to detect light reflections from the surface of the work-piece 104 and convert such light reflections to electrical signals or digital signals. In certain instances, the optical sensor 106 may include an illumination source (not shown), and a photo detector (not shown). The illumination source may be configured to illuminate the surface of the work-piece 104 and the photo detector may be configured to capture light reflections from the surface and convert such light reflections to electrical signals or digital signals. Examples of the illumination source may include, but not limited to, an infra-red source, a light emitting diode source, or a laser source. Alternatively, the optical sensor 106 may be configured to capture the ambient light reflections from the surface of the work-piece 104, without a use of the illumination source.

In an embodiment, the optical sensor 106 may be a laser scanner and the captured first plurality of light signals may correspond to a plurality of photocurrent signals (not shown) for a plurality of points (not shown) on the surface of the work-piece 104. In another embodiment, the optical sensor 106 may be a three-dimensional (3D) laser scanner and the captured first plurality of light signals may correspond to a point cloud data of the surface of the work-piece 104. In yet another embodiment, the optical sensor 106 may be an image sensor and the captured first plurality of light signals may correspond to an image signal. In yet another embodiment, the optical sensor 106 may be a pulsed-beam scanner which may be configured to project a pulsed light beam (not shown) to illuminate the surface of the work-piece 104 and capture the first plurality of light signals that may bounce off from the surface after reflection of the projected pulsed light beam.

Other example implementations of the optical sensor 106 may include, but are not limited to, a structured-light 3D scanner, a photoconductive optical sensor, a photovoltaic optical sensor, a photodiode sensor, a photo-transistor optical sensor, an active pixel sensor (such as a complementary metal oxide (CMOS) sensor), a passive pixel sensor (such as a charge coupled device (CCD) sensor), an oversampled binary image sensor, a planar Fourier capture array (PFCA), and a back-illuminated (BSI or BI) sensor. Although not shown, in some embodiments, the optical sensor 106 may include a specialized microprocessor (or a microcontroller), a co-processor, a memory, and/or a graphic processing unit (GPU) integrated with the optical sensor 106.

The projection device 108 may include suitable logic, circuitry, and interfaces that may be configured to illuminate the surface the work-piece 104 by a pattern of light (e.g., a pattern of light 108a). Examples of the pattern of light may include, but is not limited to, a square-grid pattern, a hex-grid pattern, or a polygon-based grid pattern. The projection device 108 may include, for example, at least one of a light source, a lens, a reflector, a mirror, a source driver circuit, and the like. The source driver circuit may be configured to drive the light source so as to generate the pattern of light. Examples of the projection device 108 may include, but is not limited to, a laser array, a laser-based projection device, an overhead projection device, a handheld projection device, and an image-based projection device.

The circuitry 110 may include suitable logic, circuits, and interfaces that may be configured to execute program instructions associated with operations to be executed by the system 102. Some of the operations may include, for example, a scan of the surface of the work-piece 104, a determination of surface features of the work-piece 104, a control of the projection device 108 to project the pattern of light onto the surface of the work-piece 104, and the like. The circuitry 110 may include one or more processing units, which may be implemented as a separate processor. In an embodiment, the one or more processing units may be implemented as one integrated processor or a cluster of processors that execute the functions of the one or more processing units, collectively. The circuitry 110 may be implemented based on a number of processor technologies known in the art. Examples of the circuitry 110 may include, but are not limited to, an x86-based processor, a Graphical Processing Unit (GPU), a Reduced Instruction Set Computer (RISC) processor, an Application Specific Integrated Circuit (ASIC) processor, a Complex Instruction Set Computer (CISC) processor, a microcontroller, a Central Processing Unit (CPU), and/or a combination thereof.

The cutting tool 112 may be one of an article of manufacture, a machine, or a combination thereof and may be used to apply cuts on at least portion of the surface of the work-piece 104. The application of the cutting tool 112 may be based on the projected pattern of light. In some embodiments, the projection device 108 and the optical sensor 106 may be mounted on the cutting tool 112. Examples of the cutting tool 112 may include, but is not limited to, a cutting knife, a cutting blade, a drill, a saw, a scissor, a clay cutter, a gas cutter, a single-point cutting tool, a multi-point cutting tool, or a double-point cutting tool. In some other embodiments, the cutting tool 112 may be coupled to an automated machine, for example, a Computer Numeric Control (CNC) machine (not shown) which may include a motorized gantry to control a movement of the cutting tool 112.

In operation, the work-piece 104 may be placed on a modeling platform (not shown). The circuitry 110 may be configured to control the optical sensor 106 to scan surface of the work-piece 104, more specifically, to capture the first plurality of light signals which bounce off from the surface of the work-piece 104. The captured first plurality of light signals may correspond to, for example, one or more of an image signal, photocurrent signals, 2D/3D position dataset of spatially sampled points on the surface, a 2D/3D point cloud, or depth information of the surface.

The circuitry 110 may be further configured to estimate a plurality of surface features of the work-piece 104 based on the captured plurality of light signals. The plurality of surface features may define a surface profile of the work-piece 104 and may include at least two or more of, for example, a concave surface region, a convex surface region, a saddle surface region, a flat region, a sloped surface region, an edge, a contour, a surface texture, a crack, a peak surface portion, a pit portion, and a ridge portion. Additionally, or alternatively, the plurality of surface features may include latent representations of certain observable surface features. Such latent representations may include, for example, a reflectance map, a curvature map, a contour map, or a two-dimensional (2D) contour plot of the surface of the work-piece 104.

The circuitry 110 may be further configured to determine projection information for a pattern of light to be projected onto the surface of the work-piece 104, based on the estimated plurality of surface features. The projection information may include, for example, a resolution of the pattern of light, a grid cell size, an intensity or a color of a segment of the pattern of light, and a size or a span of the pattern of light. The circuitry 110 may be further configured to control the projection device 108 to project the pattern of light onto the surface of the work-piece 104, based on the determined projection information.

By way of example, the clay model 114 includes a first curved portion 114a, a flat portion 114b, and a second curved portion 114c. The circuitry 110 may be configured to process a plurality of surface features of the clay model 114 to estimate the projection information. Such projection information may include a smaller grid cell size for the first curved portion 114a and a greater grid cell size for the flat portion 114b and the second curved portion 114c, respectively. Accordingly, a grid pattern of light (i.e. the pattern of light) may be projected onto the surface of the clay model 114, based on the estimated projection information.

Figure 2:
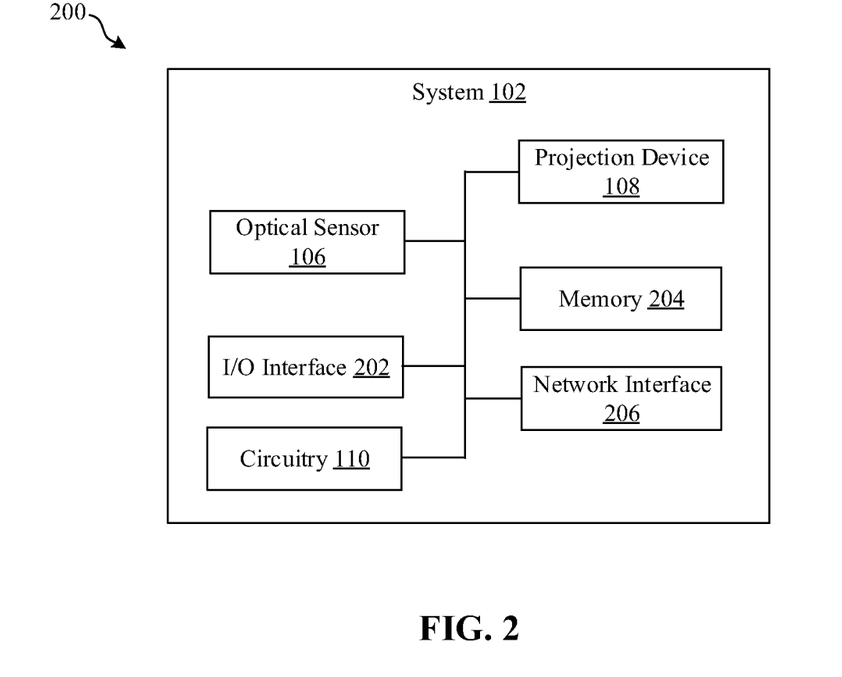
FIG. 2 illustrates an exemplary block diagram of a system for projection of a pattern of light on a work-piece, in accordance with an embodiment of the disclosure.

FIG. 2 illustrates an exemplary block diagram of a system for projection of a pattern of light on a work-piece, in accordance with an embodiment of the disclosure. FIG. 2 is explained in conjunction with elements from FIG. 1. With reference to FIG. 2, there is shown an exemplary block diagram 200 of the system 102. The system 102 may include the optical sensor 106, the projection device 108, the circuitry 110, an input/output (I/O) interface 202, a memory 204, and a network interface 206.

The I/O interface 202 may include suitable logic, circuitry, and interfaces that may be configured to act as an interface between a user associated with the system 102 and different operational components of the system 102. The I/O interface 202 may receive user-inputs and/or render outputs based on the user-inputs. The I/O interface 202 may include at least one input device and/or at least one output device. Examples of the input device may include, but is not limited to, a touch screen, a keyboard, a mouse, a joystick, a microphone, a gesture controller, an image sensor and/or and other image capture devices. Examples of the output device may include, but is not limited to, a display screen (such as a Liquid Crystal Display (LCD) or a Light Emitting Diode (LED) display), a haptic device, and/or a speaker.

The memory 204 may include suitable logic, circuitry, and/or interfaces that may store instructions executable by the circuitry 110. The memory 204 may also store the plurality of surface features, the projection information, and/or other intermediate information generated during the operation of the system 102. The memory 204 may be a persistent storage medium, a non-persistent storage medium, or a combination thereof. Examples of implementation of the memory 204 may include, but are not limited to, Random Access Memory (RAM), Read Only Memory (ROM), Electrically Erasable Programmable Read-Only Memory (EEPROM), Programmable Read-Only Memory (PROM), Hard Disk Drive (HDD), Solid State Drive (SSD), flash memory, cache memory, and/or a Secure Digital (SD) card.

The network interface 206 may include suitable logic, circuitry, and/or interfaces that may be configured to facilitate communication between the system 102 and other networking devices. The network interface 206 may be implemented by use of various known technologies to support wired or wireless communication of the system 102 with other networking devices. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to FIG. 2 without departing from the scope of the present disclosure. For example, the exemplary block diagram 200 may include more or fewer elements than those illustrated and described in the present disclosure. Operations executed by the system 102 are described in detail, for example, in FIGS. 3, 4A, 4B, 5A, 5B, and 6.

Figure 3:
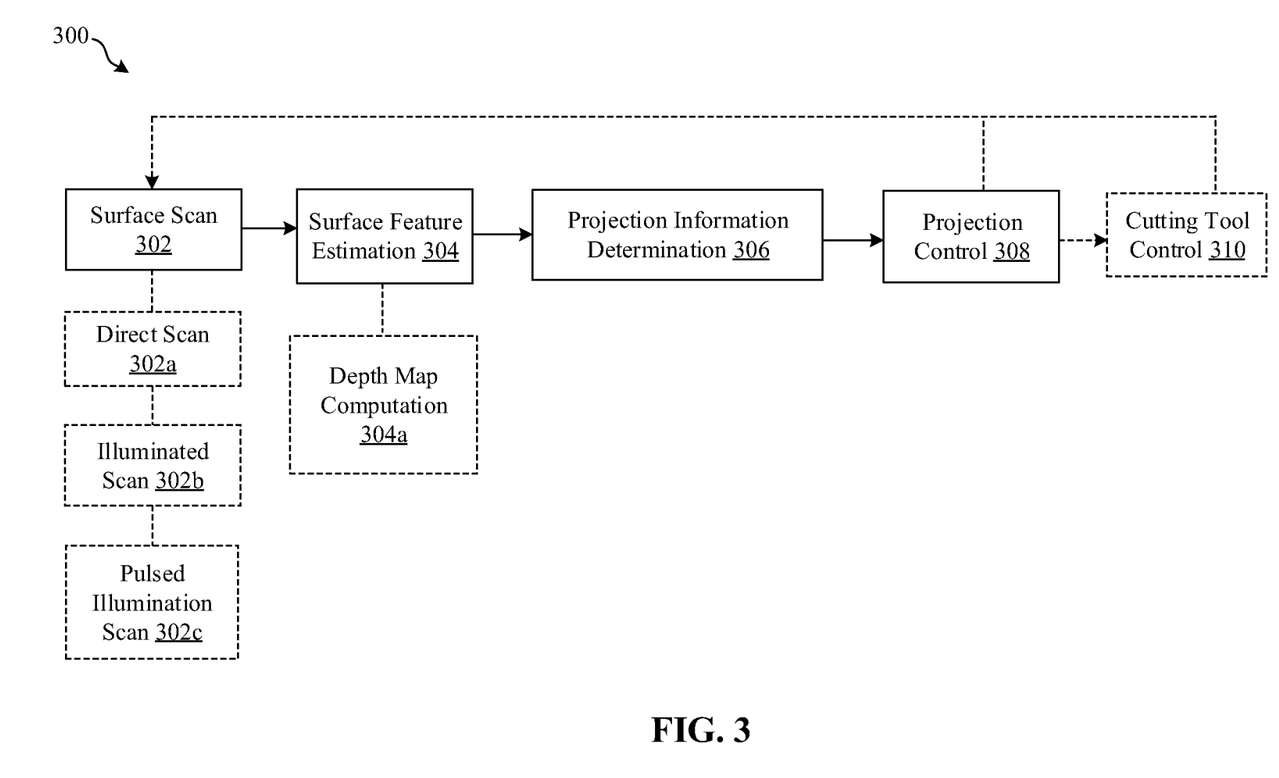
FIG. 3 illustrates a block diagram of exemplary operations for projection of a pattern of light on a work-piece, in accordance with an embodiment of the disclosure.

FIG. 3 illustrates a block diagram of exemplary operations for projection of a pattern of light on a work-piece, in accordance with an embodiment of the disclosure. FIG. 3 is explained in conjunction with elements from FIGS. 1 and 2. With reference to FIG. 3, there is shown a processing pipeline 300 of exemplary operations from 302 to 310. The outlined operations from 302 to 310 are only provided as examples, and some of the operations and actions may be optional, combined into fewer operations and actions, or expanded into additional operations and actions without detracting from the essence of the disclosed embodiments.

At 302, a surface scan operation may be executed. In the surface scan operation, the optical sensor 106 may be configured to capture a first plurality of light signals which may bounce off or reflect from the surface of the work-piece 104. The surface scan 304 operation may include at least one of a direct scan 302a, an illuminated scan 302b, or a pulsed illumination scan 302c, as described herein.

In the direct scan 302a, the optical sensor 106 may be configured to capture ambient light reflections from the surface of the work-piece 104 so as to capture the first plurality of light signals. Whereas, in the illuminated scan 302b, the optical sensor 106 may be configured to illuminate the surface of the work-piece 104 based on projection of light signals of specific frequency band (e.g., IR band, Radio Frequency (RF) Band, or visible light frequency). The first plurality of light signals as reflections of the illumination from the surface of the work-piece 104. In the pulsed illumination scan 302c, the optical sensor 106 may be configured to project a pulsed light beam to illuminate the surface of the work-piece 104 and capture the first plurality of light signals that bounce off from the surface after reflection of the projected pulsed light beam.

At 304, a surface feature estimation operation may be executed. In the surface feature estimation operation, the circuitry 110 may be configured to estimate a plurality of surface features of the work-piece 104 based on the captured first plurality of light signals. Examples of the surface features may include, but are not limited to, a concave surface region, a convex surface region, a saddle surface region, a flat region, a sloped surface region, an edge, a contour, a surface texture, a crack, a peak surface portion, a pit portion, and a ridge portion. While some of the surface features may be physically observable on the surface, other surface features, such as reflectance maps, curvature maps, contour maps, and 2D contour plots, may be mathematical or latent representations of some of the surface features and may be computed in terms of, for example, depth information of points on the surface, contour lines, and the like.

By way of example, the surface feature estimation operation may include a depth map computation 304a. In the depth map computation 304a, the circuitry 110 may be configured to compute a depth map of the surface of the work-piece 104 based on the captured first plurality of light signals. The computed depth map may include depth information which may be computed based on, for example, a TOF measurements or phase delay in the captured first plurality of light signals. The depth map may include a plurality of distance values, where each distance value may be between an image plane of the optical sensor 106 and a corresponding point of a plurality of surface points on the surface of the work-piece 104. The plurality of distance values may be represented in a matrix form of depth values and may be referred to as the depth map. The circuitry 110 may be configured to estimate one or more surface features of the plurality of surface features based on the computed depth map.

At 306, a projection information determination operation may be executed. In the projection information determination operation, the circuitry 110 may be configured to determine projection information for a pattern of light to be projected onto the surface of the work-piece 104. Such projection information may be determined based on the estimated plurality of surface features and may include, for example, a particular pattern of the pattern of light, a grid cell size for the pattern of light, color or intensity values for certain segments of the pattern of light, and the like.

In one or more embodiments, the circuitry 110 may be configured to estimate a size of the work-piece 104 based on the estimated plurality of surface features and determine a scaling factor for the pattern of light based on the estimated size of the work-piece 104. In such instances, the projection information of the pattern of light may be determined further based on the determined scaling factor. As an example, if the pattern of light to be projected on a surface size of "1 unit area" has a size of "1 unit area", then for a surface with surface size of "0.5 unit area", a scaling factor of "½" may be used to determine a new size of the pattern of light.

In one or more embodiments, the circuitry 110 may be configured to estimate a density of observable surface features of the estimated plurality of surface features on the surface of the work-piece 104. Based on the estimation of the density of observable surface features, the circuitry 110 may be configured to determine a grid cell size for the pattern of light. In such instances, the projection information of the pattern of light may be determined further based on the determined grid cell size. As an example, if the pattern of light to be projected is a grid pattern of light with a default grid size of "4×4" on an observable surface feature of "1 unit area", then for one or more surface features with a surface size of about "0.5 unit area", a scaling factor of "½" may be used to determine a new grid size of "2×2". This may help to add more grid lines per unit area, especially for intricate or detailed surface features.

As another example, with reference to FIG. 1, the first curved portion 114a is smaller in size as compared to both the flat portion 114b and the second curved portion 114c. In such instances, a grid cell size for different segments of the pattern of light may be set in accordance with respective sizes of the first curved portion 114a, the flat portion 114b, and the second curved portion 114c. Thus, the projection of the pattern of light may include more grid cells per unit area in the first curved portion 114a as compared to the grid cells in the flat portion 114b and the second curved portion 114c.

In one or more embodiments, the circuitry 110 may be configured to identify a first shape-component of the work-piece 104 based on the estimated plurality of surface features. Such an identified first shape-component of the work-piece 104 may be stored in the memory 204. The circuitry 110 may be further configured to detect an anomaly on a surface portion of the identified first shape-component based on a true shape information for the first shape-component. As an example, the anomaly may be detected based on a comparison between the identified first shape-component and the true shape information of the first shape-component. As another example, on a work-piece of a miniaturized model of a car, a side window of the car may be identified as a shape component which may be compared with true shape information for the side window. In case of a mismatch, a region on the work-piece which deviates from a true shape of the window may be identified as the anomaly.

The circuitry 110 may be further configured to select one or more appearance attributes for a segment of the pattern of light to be projected onto the surface portion of the work-piece 104. Such selection may be based on the detected anomaly on the surface portion. The one or more appearance attributes may be selected from a set of appearance attributes, including but not limited to, a color of the segment, a thickness of the segment, an intensity or a brightness of the segment, or a sharpness of the segment. The projection information may be further determined based on the selected one or more appearance attributes. For example, grid lines of the pattern of light on region(s) which correspond to a region affected by the anomaly may be of a different color or a different intensity or thickness as compared to other regions on the work-piece 104.

At 308, a projection control operation may be executed. In the projection control operation, the circuitry 110 may be configured to control the projection device 108 to project the pattern of light onto the surface of the work-piece 104 based on the determined projection information. The projected pattern of light may assist designers to apply suitable cuts and or cutting maneuvers on the work-piece 104. Examples of the projected pattern of light may include, but is not limited to, a triangular mesh, a square-grid pattern, and a hex-grid pattern.

In certain exemplary scenarios, a portion of the surface exposed to the optical sensor 106 and the projection device 108 may encounter a change. Such a change may be based on, for example, a new cut on the surface, a surface deformation, an occlusion of the portion of the surface, and the like. This may require a re-estimation of some or all of the plurality of surface features of the work-piece 104. The circuitry 110 may be configured to control the optical sensor 106 to capture a second plurality of light signals which may bounce off from the surface of the work-piece 104. Thereafter, the circuitry 110 may be further configured to detect a change in a portion of the surface of the work-piece 104 and re-estimate one or more surface features of the estimated plurality of surface features based on the detected change in the portion of the surface. Such a change may be detected based on, for example, a comparison between the first plurality of light signals and the second plurality of light signals. The circuitry 110 may be further configured to modify the projection information based on the re-estimated one or more surface features and may control the projection device 108 to project a second pattern of light onto the surface of the work-piece 104 based on the modified projection information. The second pattern of light may highlight the portion of the surface which suffered the change based on changes in appearance attribute(s) of a portion of the second pattern of light.

At 310, a cutting tool control operation may be executed. In the cutting tool control operation, the circuitry 110 may be configured to control the cutting tool 112 to apply a cut on a portion of the surface of the work-piece 104 based on the projected pattern of light. Additionally, or alternatively, the cutting tool 112 may include a provision (not shown) to integrally accommodate the optical sensor 106, the projection device 108, and the circuitry 110. Such a provision in the cutting tool 112 may allow for a compact arrangement of the optical sensor 106, the projection device 108, and the circuitry 110 and further allow for the cutting tool 112 to be used in a portable manner as a handheld tool.

In certain embodiments, the work-piece 104 may be placed on an electronically-guidable platform (not shown). Once the cutting tool control operation on one side of the surface is executed, the circuitry 110 may be configured to move the electronically-guidable platform so as to alter a position of the work-piece 104 and/or expose a different surface of the work-piece 104 to the optical sensor 106 and the projection device 108. Alternatively, in certain other embodiments, the cutting tool 112 may be placed on an electronically-guidable platform (not shown). Once the cutting tool control operation on one side of the surface is executed, the circuitry 110 may be configured to move the electronically-guidable platform so as to alter a position of the cutting tool 112 and/or expose a different surface of the work-piece 104 to the optical sensor 106 and the projection device 108. Thereafter, the circuitry 110 may be further configured to repeat operations from 302 to 310 for the different surface of the work-piece 104 and re-initiate the processing pipeline 300.

Figure 4A:
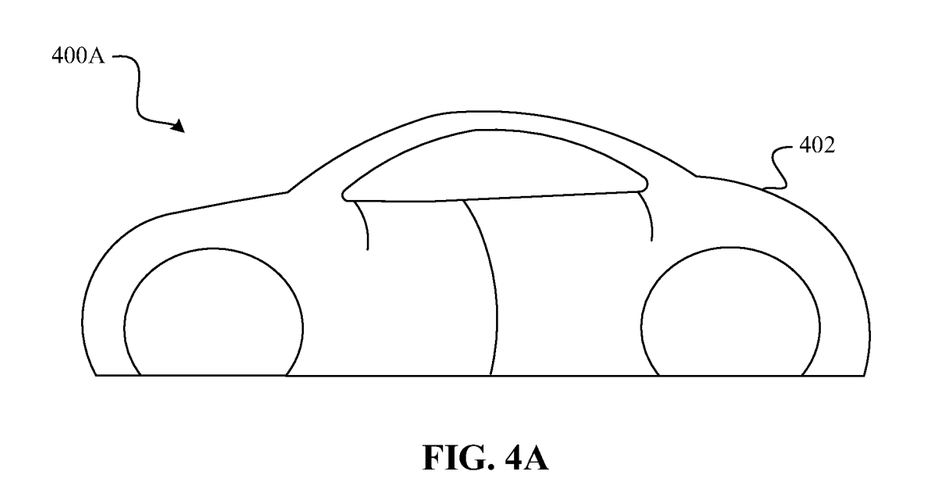
FIG. 4A is a diagram that illustrates a true shape of an example car model, in accordance with an embodiment of the disclosure.

FIG. 4A is a diagram that illustrates a true shape of an example car model, in accordance with an embodiment of the disclosure. FIG. 4A is explained in conjunction with elements from FIGS. 1, 2 and 3. With reference to FIG. 4A, there is shown a true shape 400A of an example car model 402. The true shape 400A may be a desired shape or a reference design of the example car model to be obtained from a work-piece. True shape information for the example car model, i.e., the first shape-component, may be preset in the memory 204.

Figure 4B:
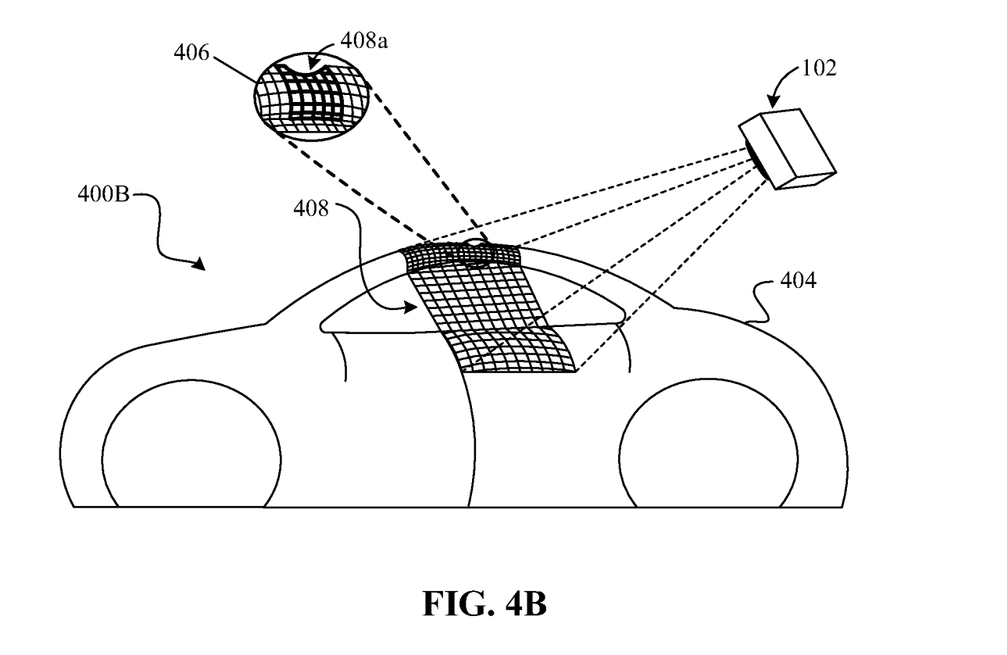
FIG. 4B illustrates an exemplary scenario for projection of a pattern of light on a work-piece for the example car model of FIG. 4A, in accordance with an embodiment of the disclosure.

FIG. 4B illustrates an exemplary scenario for projection of a pattern of light on a work-piece for the example car model of FIG. 4A, in accordance with an embodiment of the disclosure. FIG. 4B is explained in conjunction with elements from FIGS. 1, 2, 3, and 4A. With reference to FIG. 4B, there is shown an actual shape 400B of a work-piece 404 for the example car model 402. The exemplary scenario of anomaly detection is described herein. The circuitry 110 may be configured to identify a roof portion 406 of the work-piece 404 as a first shape component of the work-piece 404. The identified first shape-component may be compared with the true shape information of the first shape-component (as shown in FIG. 4A). Based on such comparison, the circuitry 110 may be configured to detect an anomaly on a surface portion of the work-piece 404, i.e. an anomaly on the roof portion 406. Once the anomaly is detected, the circuitry 110 may be configured to select an appearance attribute for a segment 408a of a pattern of light 408 to be projected onto the roof portion 406, based on the detected anomaly. As shown, for example, the selected appearance attribute may be a different thickness or intensity of the segment 408a of the pattern of light 408 to be projected onto the roof portion 406. The circuitry 110 may be further configured to determine the projection information based on the selected appearance attribute and control the projection device 108 to project the pattern of light 408 onto the surface of the work-piece based on the determined projection information.

Figure 5A:
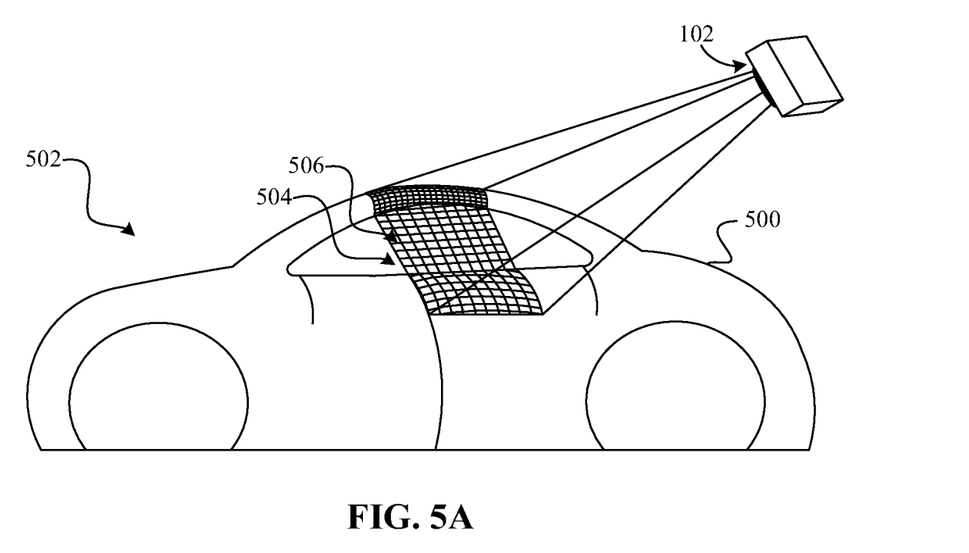
FIG. 5A is a diagram that illustrates projection of a pattern of light on a first surface of a work-piece, in accordance with an embodiment of the disclosure.

FIG. 5A is a diagram that illustrates projection of a pattern of light on a first surface of a work-piece, in accordance with an embodiment of the disclosure. FIG. 5A is explained in conjunction with elements from FIGS. 1, 2, 3, 4A, and 4B. With reference to FIG. 5A, there is shown a work-piece 500 of an example car. The work-piece 500 may be initially disposed in a state 502, where a first surface 504 of the work-piece 500 may be exposed to a pattern of light 506. The pattern of light 506 may be projected by the projection device 108 of the system 102.

Figure 5B:
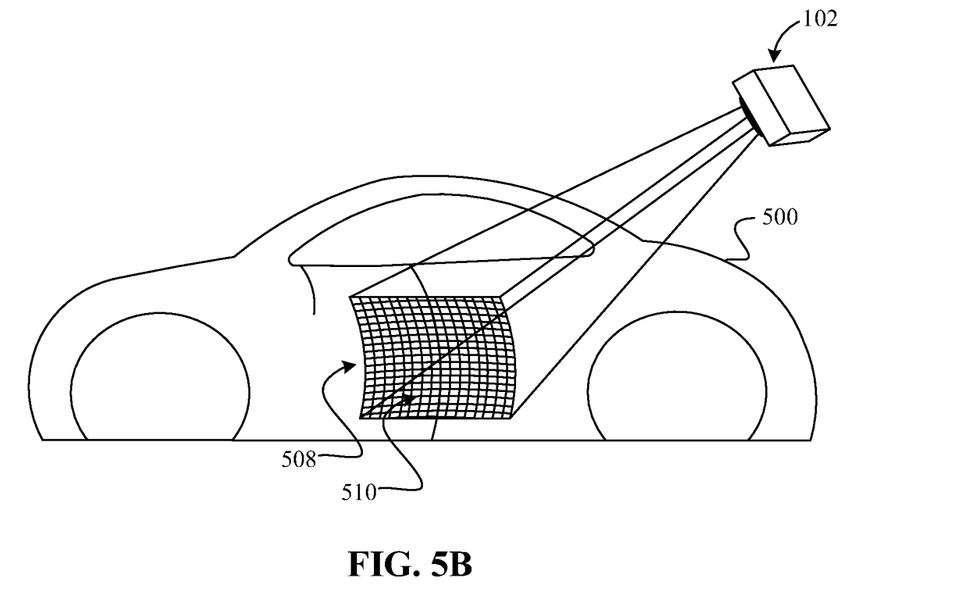
FIG. 5B is a diagram that illustrates projection of a different pattern of light on a second surface of the work-piece of FIG. 5A, in accordance with an embodiment of the disclosure.

FIG. 5B is a diagram that illustrates projection of a different pattern of light on a second surface of the work-piece of FIG. 5A, in accordance with an embodiment of the disclosure. FIG. 5B is explained in conjunction with elements from FIGS. 1, 2, 3, 4A, 4B, and 5A. At a certain time instant, the position of the work-piece 500 may change. As a result, the work-piece 500 may expose a second surface 508 to the optical sensor 106 and the projection device 108. Thus, the circuitry 110 may be configured to control the optical sensor 106 to capture a second plurality of light signals that may bounce off from the second surface 508 of the work-piece 500 and detect a change from the first surface 504 to the second surface 508 of the work-piece 500 based on a comparison between the captured first plurality of light signals and the captured second plurality of light signals. Based on the detected change, the circuitry 110 may be configured to re-estimate one or more surface features of the estimated plurality of surface features for the second surface 508. The circuitry 110 may be further configured to modify the projection information based on the re-estimated one or more surface features and control the projection device 108 to project a second pattern of light 510 onto the second surface 508 of the work-piece 500, based on the modified projection information.

Figure 6:
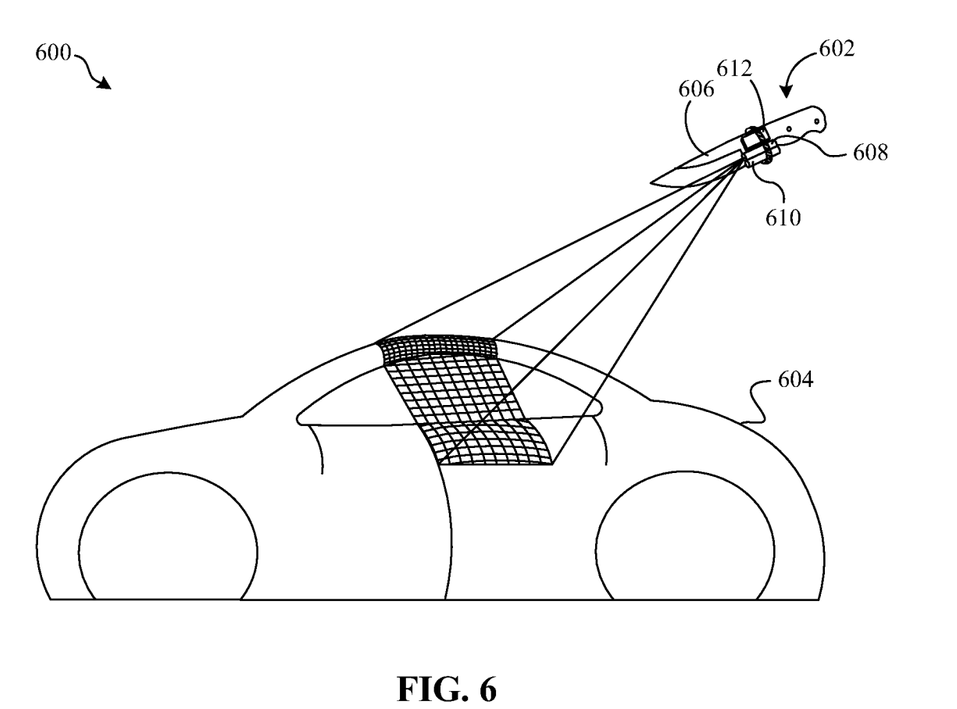
FIG. 6 illustrates an exemplary implementation of the system of FIG. 1 as a handheld knife, in accordance with an embodiment of the disclosure.

FIG. 6 illustrates an exemplary implementation of the system of FIG. 1 as a handheld knife, in accordance with an embodiment of the disclosure. FIG. 6 is explained in conjunction with elements from FIGS. 1, 2, 3, 4A, 4B, 5A, and 5B. With reference to FIG. 6, there is shown a handheld knife 602 as an exemplary implementation 600 of the system 102 of FIG. 1. There is further shown an example work-piece 604 of a car. The handheld knife 602 may include a knife body 606, a projection device 608, an optical sensor 610, and circuitry 612. Each of the projection device 608, the optical sensor 610, and the circuitry 612 may be mounted on the knife body 606 (i.e. a cutting tool). Alternatively, the handheld knife 602 may include a provision to integrally accommodate the projection device 608, the optical sensor 610, and the circuitry 612. Operations of the handheld knife 602 may remain same as described in FIG. 1 and described further, for example, in FIGS. 3, 4A, 4B, 5A, and 5B.

Figure 7:
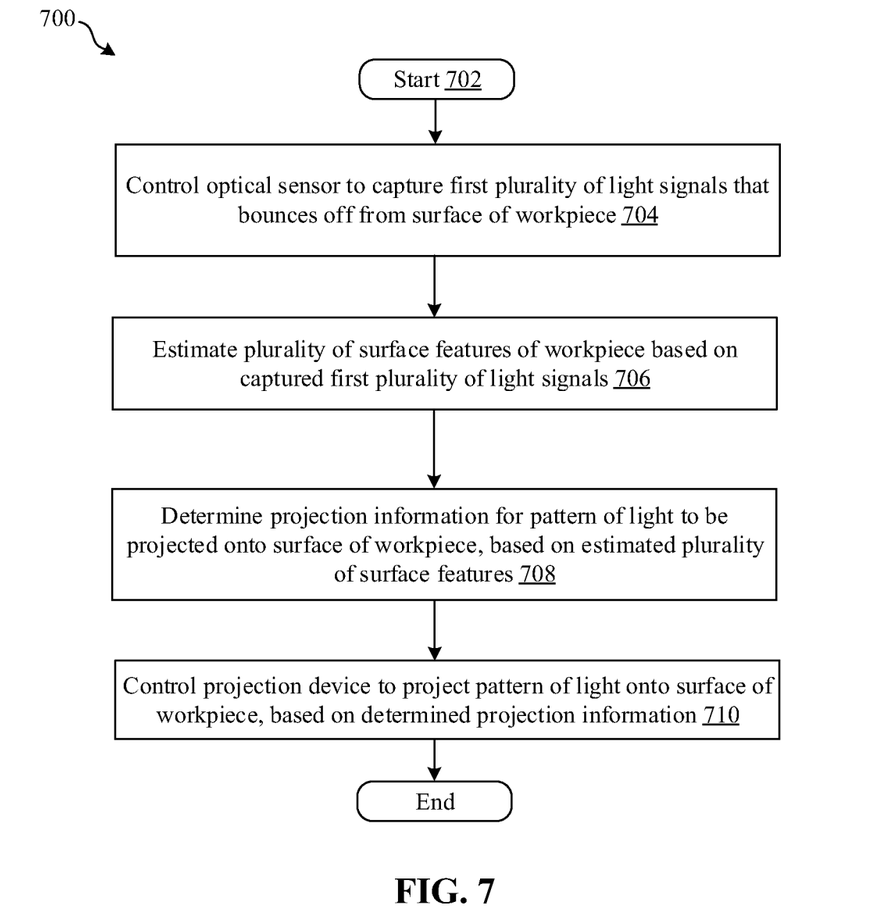
FIG. 7 illustrates a flowchart of an exemplary method for projection of a pattern of light on a work-piece, in accordance with an embodiment of the disclosure.

FIG. 7 illustrates a flowchart of an exemplary method for projection of a pattern of light on a work-piece, in accordance with an embodiment of the disclosure. FIG. 7 is explained in conjunction with elements from FIGS. 1, 2, 3, 4A, 4B, 5A, 5B, and 6. With reference to FIG. 7, there is shown a flowchart 700. Any system, for example, the system 102, may execute operations specified in the flowchart 700. The method illustrated in the flowchart 700 may start from 702 and proceed to 704.

At 704, the optical sensor 106 may be controlled to capture a first plurality of light signals that bouncing off from surface of the work-piece 104. In accordance with an embodiment, the circuitry 110 may be configured to control the optical sensor 106 to capture the first plurality of light signals that may bounce off from surface of the work-piece 104.

At 706, a plurality of surface features may be estimated based on the captured first plurality of light signals. In accordance with an embodiment, the circuitry 110 may be configured to estimate the plurality of surface features based on the captured first plurality of light signals.

At 708, projection information for the pattern of light to be projected on the surface of the work-piece 104 may be determined based on the estimated plurality of surface features. In accordance with an embodiment, the circuitry 110 may be configured to determine the projection information based on the estimated plurality of surface features.

At 710, the projection device 108 may be controlled to project the pattern of the light on the surface of the work-piece 104, based on the determined projection information. In accordance with an embodiment, the circuitry 110 may be configured to control the projection device 108 to project the pattern of light onto the surface of the work-piece 104, based on the determined projection information. Control may pass to end.

Although, the flowchart 700 is illustrated as discrete operations, such as 702, 704, 706 and 708. However, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

The invention claimed is:

1. A system, comprising:
a projection device;
a handheld cutting tool;
an optical sensor; and
circuitry configured to:
control the optical sensor to capture a first plurality of light signals that bounces off from a surface of a work-piece;
estimate a plurality of surface features of the work-piece based on the captured first plurality of light signals;
select an appearance attribute for a segment of the pattern of light to be projected onto a first observable surface feature of the estimated plurality of surface features;
determine projection information for a pattern of light to be projected onto the first observable surface feature of the estimated plurality of surface features of the work-piece, based on the appearance attribute for a segment of the pattern of light;
project a pulsed light beam to illuminate the surface of the work-piece;
capture the first plurality of light signals that bounce off from the surface after reflection of the projected pulsed light beam; and
control the projection device to project the pattern of light onto multiple surfaces of the work-piece, based on the determined projection information to assist a user of the handheld cutting tool.

2. The system according to claim 1, wherein the plurality of surface features comprises two or more of a concave surface region, a convex surface region, a saddle surface region, a flat region, a sloped surface region, an edge, a contour, a surface texture, a crack, a peak surface portion, a pit portion, a ridge portion, a reflectance map, a curvature map, a contour map, and a two-dimensional (2D) contour plot.

3. The system according to claim 1, wherein the optical sensor is an image sensor and the captured first plurality of light signals correspond to an image signal.

4. The system according to claim 1, wherein the optical sensor is a laser scanner and the captured first plurality of light signals correspond to a plurality of photocurrent signals for a plurality of points on the surface of the work-piece.

5. The system according to claim 1, wherein the circuitry is further configured to:
compute a depth map of the surface of the work-piece based on the captured first plurality of light signals; and
estimate one or more surface features of the plurality of surface features based on the computed depth map.

6. The system according to claim 1, wherein the pattern of light is a grid pattern of light.

7. The system according to claim 6, wherein the circuitry is further configured to:
estimate a size of the work-piece based on the estimated plurality of surface features;
determine a scaling factor for the grid pattern of light based on the estimated size; and
determine the projection information based on the determined scaling factor.

8. The system according to claim 6, wherein the circuitry is further configured to:
estimate a density of observable surface features of the estimated plurality of surface features on the surface of the work-piece;
determine a grid cell size for the grid pattern of light based on the estimated density of observable surface features; and
determine the projection information based on the determined grid cell size.

9. The system according to claim 1, wherein the circuitry is further configured to:
identify a first shape-component of the work-piece based on the estimated plurality of surface features;
detect an anomaly on a surface portion of the identified first shape-component based on true shape information for the first shape-component;
select one or more appearance attributes for a segment of the pattern of light to be projected onto the surface portion, based on the detected anomaly,
wherein the one or more appearance attributes are selected from a set of appearance attributes comprising a color of the segment, a thickness of the segment, an intensity or a brightness of the segment, or a sharpness of the segment; and
determine the projection information based on the selected one or more appearance attributes.

10. The system according to claim 1, wherein the circuitry is further configured to:
identify a first shape-component of the work-piece based on the estimated plurality of surface features;
detect an anomaly on a surface portion of the identified first shape-component based on true shape information for the first shape-component;
select one or more appearance attributes for a segment of the pattern of light to be projected onto the surface portion, based on the detected anomaly,
wherein the one or more appearance attributes are selected from a set of appearance attributes comprising a color of the segment, a thickness of the segment, an intensity or a brightness of the segment, or a sharpness of the segment; and
determine the projection information based on the selected one or more appearance attributes.

11. The system according to claim 1, wherein the projection device and the optical sensor are mounted on the handheld cutting tool.

12. The system according to claim 11, wherein the handheld cutting tool is one of a cutting knife, a cutting blade, a drill, a saw, a scissor, a clay cutter, a gas cutter, a single-point cutting tool, a multi-point cutting tool, or a double-point cutting tool.

13. The system according to claim 1, wherein the work-piece is made up partially or completely of one of a metal, wood, clay, glass, a fabric, an organic polymer, an inorganic polymer, or a hybrid polymer.

14. A method, comprising:
in a system comprising a handheld cutting device with a projection device and an three-dimensional laser scanner:
controlling the three-dimensional laser scanner to capture a first plurality of light signals that bounces off from the surface of a work-piece and correspond to point cloud data of the surface of the workpiece;
estimating a plurality of surface features of the work-piece based on the captured first plurality of light signals;
selecting an appearance attribute for a segment of the pattern of light to be projected onto a first observable surface feature of the estimated plurality of surface features;
determining projection information for a pattern of light to be projected onto the first observable surface feature of the estimated plurality of surface features surface of the work-piece, based on the appearance attribute for a segment of the pattern of light; and
controlling the projection device to project the pattern of light onto the surface of the work-piece, based on the determined projection information.

15. The method according to claim 14, wherein the plurality of surface features comprises two or more of a concave surface region, a convex surface region, a saddle surface region, a flat region, a sloped surface region, an edge, a contour, a surface texture, a crack, a peak surface portion, a pit portion, a ridge portion, a reflectance map, a curvature map, a contour map, and a two-dimensional (2D) contour plot.

16. The method according to claim 14, wherein the optical sensor is a laser scanner and the captured first plurality of light signals correspond to a plurality of photocurrent signals for a plurality of points on the surface of the work-piece.

* * * * *